United States Patent [19]

Kidwell, Jr. et al.

[11] 4,387,167

[45] * Jun. 7, 1983

[54] SULFUR-BASED ADDUCTS AND COMPOSITIONS

[75] Inventors: Louis E. Kidwell, Jr.; Dysart E. Holcomb, both of Shreveport, La.

[73] Assignee: Pennzoil Company, Houston, Tex.

[ * ] Notice: The portion of the term of this patent subsequent to Nov. 24, 1998, has been disclaimed.

[21] Appl. No.: 296,176

[22] Filed: Aug. 25, 1981

Related U.S. Application Data

[63] Continuation-in-part of Ser. No. 116,863, Jan. 30, 1980, Pat. No. 4,302,255.

[51] Int. Cl.$^3$ ............................................. C04B 33/04
[52] U.S. Cl. .................................. 501/140; 106/274; 106/275; 106/287.32
[58] Field of Search ............ 106/70, 274, 275, 287.32; 528/389; 501/140

[56] References Cited

U.S. PATENT DOCUMENTS

| | | | |
|---|---|---|---|
| 2,039,070 | 4/1936 | Duecker | 528/389 |
| 2,135,747 | 11/1936 | Duecker | 528/389 |
| 2,806,843 | 9/1957 | Welch | 528/389 |
| 3,231,546 | 1/1966 | Bertozzi et al. | 528/389 |
| 3,264,239 | 8/1966 | Rosen et al. | 528/389 |
| 3,459,717 | 8/1969 | Signouret | 528/389 |
| 3,823,019 | 7/1974 | Dale et al. | 106/287.32 |
| 3,887,504 | 7/1974 | Woo | 260/17.4 R |
| 3,997,355 | 12/1976 | Santucci et al. | 106/287.32 |
| 4,011,179 | 3/1977 | Woo et al. | 528/389 |
| 4,022,626 | 5/1977 | McBee et al. | 106/287.32 |
| 4,058,500 | 11/1977 | Vroom | 528/389 |
| 4,155,771 | 5/1979 | Cassar | 106/287.32 |
| 4,164,428 | 8/1979 | Simic | 528/389 |
| 4,177,097 | 12/1979 | Espenscheid | 528/389 |
| 4,190,460 | 2/1980 | Cassar | 106/287.32 |
| 4,302,255 | 11/1981 | Kidwell et al. | 106/275 |
| 4,311,826 | 1/1982 | McBee et al. | 528/389 |

OTHER PUBLICATIONS

Chemical Abstracts, p. 3424.
Chemical Abstracts, vol. 43, pp. 995–1000.
Chemical and Engineering News, p. 8, Oct. 15, 1979.
Kirk–Othmer, Encyclopedia of Chem. Tech., 2d Ed., vol. 17, p. 627.
Currell et al., New Uses of Sulfur, Advances in Chem. Series 140, Amer. Chem. Soc., Wash., D.C., pp. 1–17, (1975).
Fike, H. L., Sulfur Coatings, A Review and Status Report, Sulfur Use Symposium; Madrid, Spain, (May 19, 1976).

*Primary Examiner*—James Poer
*Attorney, Agent, or Firm*—Lowe, King, Price & Becker

[57] ABSTRACT

A novel sulfur-based adduct formed by reacting sulfur with a diene-containing by-product hydrocarbon mixture available from petrochemical operations and/or from coal processing. The adduct is a reaction product of sulfur and each of the dienes contained in the by-product mixture. Also disclosed is a road surface composition containing this adduct as an asphalt extender or as a replacement for asphalt, and there are also disclosed other compositions containing this adduct such as sulfur cements, sulfur concretes, coatings, foams, structural materials and insulators.

29 Claims, No Drawings

SULFUR-BASED ADDUCTS AND COMPOSITIONS

CROSS-REFERENCE TO RELATED APPLICATION

This application is a continuation-in-part of U.S. application Ser. No. 116,863 filed Jan. 30, 1980 now U.S. Pat. No. 4,302,255, issued Nov. 24, 1981.

TECHNICAL FIELD

This invention relates to a modified sulfur product formed from a diene-containing by-product hydrocarbon mixture and to compositions formed from ths product.

BACKGROUND ART

As a result of environmental considerations, increasing amounts of sulfur are being removed from natural gas and from flue gases, thus resulting in an abundant supply of this commodity. A decreasing world supply of crude oil increases the desirability of finding substitutes for crude oil-based products such as asphalt. Therefore, the use of a sulfur-based material that can be used as an extender for asphalt or as an asphalt replacement, for example, in highway construction is very desirable.

Sulfur has been proven to be a valuable component in construction materials. However, if unmodified, it imparts crystalline and brittle characteristics to those compositions in which it is used.

Accordingly, the prior art has modified sulfur with various materials. For example, sulfur has been modified with an olefin such as ethylene. Illustrative of this type of prior art are U.S. Pat. Nos. 2,039,070 and 2,135,747 to Duecker. Sulfur has also been modified with an olefinic hydrocarbon polymer derived from petroleum, as illustrated by U.S. Pat. No. 4,058,500 to Vroom. Other prior art has modified sulfur with styrene, styrene derivatives, or a cyclodiene such as dicyclopentadiene. Exemplary of this type of prior art is U.S. Pat. No. 3,459,717 to Signouret, U.S. Pat. No. 2,806,843 to Welsh, U.S. Pat. No. 3,823,019 to Dale et al., U.S. Pat. No. 3,887,504 to Woo, U.S. Pat. No. 3,997,355 to Santucci et al., U.S. Pat. No. 4,011,179 to Woo, U.S. Pat. No. 4,022,626 to McBee et al., U.S. Pat. No. 4,164,428 to Simic, the text at page 627 of Kirk-Othmer, *Encyclopedia of Chemical Technology*, 2nd Edition, Vol. 17, and B. R. Currell et al., Chapter 1 in *New Uses of Sulfur* (J. R. West, ed.), Advances in Chemistry Series 140, American Chemical Society, Washington, D.C., pp 1-17 (1975). The McBee et al. patent shows the use of dicyclopentadiene and styrene in combination as a modifying composition for sulfur.

Other prior art showing sulfur in combination with styrene or dicyclopentadiene is exemplified by U.S. Pat. No. 3,231,546 to Bertozzi et al. and by U.S. Pat. No. 3,264,239 to Rosen et al.

In addition, several formulations of a modified sulfur product called Sulphlex have been developed by the Southwest Research Institute to replace or extend asphalt in highway construction. Illustrative of these formulations in Sulphlex 126, which contains 61 wt.% sulfur and 13 wt.% of each of dicyclopentadiene, vinyltoluene and a light cut of coal tar; Sulphlex 230, which contains 70 wt.% sulfur and 15 wt.% of each of dicyclopentadiene and dipentene; and Sulphlex 233, which contains 70 wt.% sulfur, 12 wt.% dicyclopentadiene, 10 wt.% dipentene and 8 wt.% of vinyltoluene.

This prior art uses relatively expensive starting materials for the formation of the modified sulfur product. The need of the prior art to use relatively expensive starting materials such as styrene, dicyclopentadiene, dipentene, vinyltoluene or pre-reacted polysulfides has had, to the present time, an inhibiting effect on the general utilization of modified sulfur products of this type. Furthermore, this prior art does not provide a sulfur-based adduct and at the same time provide a residual by-product hydrocarbon mixture that is substantially free from dienes and pseudodienes. Dienes and pseudodienes are undesirable in refinery streams due to their tendency to form gums and to use large amounts of hydrogen in catalytic hydrotreatment processes. Moreover, this prior art fails to provide a road surface composition containing a modified sulfur product formed from a by-product hydrocarbon mixture available from petrochemical operations. In addition, this prior art does not provide coating compositions, foams, structural materials, sulfur cements and sulfur concretes formed from such a mixture.

SUMMARY OF THE INVENTION

It is accordingly one object of the present invention to provide a sulfur-based adduct having multiple uses that is formed by the reaction of sulfur with a relatively low cost by-product hydrocarbon mixture available from petrochemical operations.

A further object of the present invention is to provide a sulfur-based adduct and at the same time to provide a residual by-product hydrocarbon mixture that is relatively free of diene and pseudodiene compounds.

A still further object is to provide a road surface composition containing a modified sulfur product formed from a by-product hydrocarbon mixture available from petrochemical operations.

An even further object is to provide coating compositions, foams, structural materials, sulfur cements and sulfur concretes formed from a by-product mixture available from petrochemical operations.

Other objects and advantages of the present invention will become apparent as the description thereof proceeds.

In satisfaction of the foregoing objects and advantages, the present invention provides a sulfur-based adduct produced by reacting (a) about 5-95 wt.% of sulfur, and (b) about 95-5 wt.% of a by-product hydrocarbon mixture, which hydrocarbon mixture contains about 45-98 wt.% of aromatic, non-pseudodiene compounds, about 1-40 wt.% of diene and pseudodiene compounds, up to about 15 wt.% of other organic compounds that are substantially unreactive with sulfur, and up to about 54 wt.% of unidentifiable compounds; whereby the sulfur reacts with each of the diene and pseudodiene compounds present in the mixture. The reaction is carried out at a temperature in the range of about 100°-150° C. Also provided by the present invention is a residual by-product hydrocarbon mixture that is relatively free of dienes and pseudodienes. Furthermore, the present invention provides a road surface composition containing the sulfur-based adduct of the present invention and provides other compositions containing this sulfur-based adduct such as coating compositions, foams, structural materials, sulfur cements and sulfur concretes.

BEST MODE FOR CARRYING OUT THE INVENTION

The present invention is based upon the discovery that an excellent modified sulfur product is formed when sulfur is reacted under certain conditions with certain by-product hydrocarbon mixtures available from petrochemical operations engaged in the production of plastic, from the processing of coal and the like.

For modified sulfur products of the type described and claimed herein, it is necessary that they be inexpensively produced, exhibit good adhesion as coatings on various substrates, provide good cohesion when mixed with aggregates, have good flexural, tensile, and compressive strength, not become brittle with aging, and have a good fatigue life under adverse environmental conditions. The products of this invention meet these requirements. For instance, when the sulfur-based adduct of the present invention is used as a binder for limestone aggregate of a size gradation commonly employed in highway construction, the resulting composition has tensile strength at 104° F., Hveem stability at 140° F., static modulus of elasticity at 77° F. and 104° F., and resilient modulus of elasticity at 104° F. that are higher than limestone aggregate mixtures using asphalt or sulfur-asphalt binders.

The sulfur-based adducts of the present invention have a wide range of flexural, tensile, and compressive strengths; flexural, compressive and elastic moduli; Marshall and Hveem stabilities; and fatigue characteristics that render them suitable for use in various applications including highway construction materials, coatings, insulators, foams, cements, concretes and structural materials. More particularly, this adduct is useful as a binder for aggregate in cements; concretes and mortars; as a replacement or extender for asphalt in highway construction, in roofing shingles and in other construction applications; in the formation of a structural material such as flat plates or tiles, bricks or pipe sections; and as a coating for walls, earthen dams or tanks, drainage canals, settling tanks, tailings ponds, product storage piles and other structures. In applications such as coatings, foams, and structural materials, the adduct may be mixed with fillers such as mica, muscovite, talc, glass fiber and mixtures of these fillers, to provide special characteristics such as increased strength to the resulting composition. The filler can be added in any conventional manner, in amounts of about 5 to 30 wt.% of the total composition.

As indicated above, the general reaction of sulfur with olefins such as dicyclopentadiene is well known. In the present invention, however, it has been found that a sulfur-based adduct is formed by reacting sulfur under certain conditions with a particular by-product material that is available at relatively low cost in comparison with the types of olefinic materials that have been reacted in the past with sulfur, and that this adduct is at least comparable in properties to the modified sulfur products of the prior art.

According to the present invention, a novel modified sulfur product is formed by reacting sulfur with a by-product hydrocarbon mixture containing about 45-98 wt.% of aromatic, non-pseudodiene compounds (hereinafter called aromatic compounds), about 1-40 wt.% of diene and pseudodiene compounds (hereinafter called dienes), up to about 15 wt.% of other organic compounds that are substantially unreactive with the sulfur, and up to about 54 wt.% of unidentifiable compounds; whereby the sulfur reacts with each of the dienes in said mixture during the reaction with sulfur. Generally, these other organic compounds are paraffins. In the reaction between sulfur and the hydrocarbon mixture, sulfur reacts with the olefinic bonds of the dienes or other sulfur-reactive material contained in the mixture. It is to be understood that the term "diene" and/or "pseudodiene," as used in this application, means any sulfur-reactive material contained in the hydrocarbon mixture. For example, in certain instances, non-olefins have been found to react with the sulfur under the conditions of the reaction.

By sulfur is meant elemental sulfur. The sulfur is suitably either crystalline or amorphous or mixtures thereof, and may contain small amounts of impurities such as those normally found in commercial grades of sulfur, without deleterious effects. The sulfur is readily and inexpensively available from a variety of sources such as by mining, by means of the Frasch process or the Claus process, or by recovery from waste gases.

Exemplary by-product hydrocarbon mixtures satisfying the above description are depentanized aromatic concentrate (DAC), heavy aromatic concentrate (HAC), dripolene and light oil from coal processing, with depentanized aromatic concentrate being particularly advantageous. An especially useful depentanized aromatic concentrate contains about 50–70 wt. % of the aromatic compounds, about 30–40 wt. % of the dienes, pseudodienes, and monoolefins, about 0–2.5 wt. % of paraffins, and about 1–5 wt. % of alkynes with the remaining up to about 2 wt. % being unidentified compounds. The aromatic compounds generally include materials such as benzene, ethylbenzene, toluene, xylenes, indanes, naphthalene, and alkyl-substituted derivatives of these materials. The dienes generally include materials such as di- or tri-olefins, cycloolefins, styrene, idenes, and alkyl-substituted derivatives of these materials. The paraffins generally include both normal paraffins and isoparaffins. It is preferred that the composition also contains about a stoichiometric amount of monoolefins to react with the sulfur, the stoichiometry being based on the total amount of dienes and pseudodienes contained in the mixture. An especially preferred composition would contain about 50–80 wt. % aromatics, about 0–10 wt. % paraffins, about 10–40 wt. % monoolefins, about 10–40 wt. % of dienes and pseudodienes, about 0–5 wt. % of alkynes, and about 0–10 wt. % of cyclic aliphatic compounds.

Typical analyses of especially useful DAC compositions are set forth in Table I. As shown in this Table and following Table II, the percentages of the particular dienes present in these especially useful depentanized aromatic concentrates can vary substantially, even though the total percent of dienes remains within a narrow range.

TABLE I

| DEPENTANIZED AROMATIC CONCENTRATE | |
|---|---|
| Component | Amount |
| Olefins | |
| propene | 0.083 |
| butene | 0.727 |
| butadienes | 3.529 |
| pentadienes | 6.069 |
| pentene | 0.189 |
| hexadienes | 1.296 |
| pentatrienes | 0.032 |
| methylenecyclopentane | 0.039 |
| methylpentadienes | 0.117 |

TABLE I-continued
DEPENTANIZED AROMATIC CONCENTRATE

| Component | Amount |
|---|---|
| methylcyclopentene | 0.084 |
| cyclohexadiene | 0.592 |
| styrene | 2.670 |
| α-methylstyrene | 1.635 |
| dicyclopentadiene | 14.910 |
| vinyltoluene | 0.051 |
| indene | 0.228 |
| $C_7$ olefinic substituted naphthenes | 0.411 |
| $C_8$ olefinic substituted aromatic | 0.034 |
| $C_9$ olefinic substituted aromatic | 0.042 |
| $C_{10}$ olefinic substituted aromatic | 0.093 |
| $C_9$ alkenylbenzene | 0.059 |
| cis-propenylbenzene | 0.030 |
| unknown olefinic | 1.781 |
| Total olefinic | 34.701 |
| Alkynes | |
| butyne | 1.090 |
| Paraffins | |
| $C_5$ | 0.133 |
| Aromatics | |
| benzene | 48.093 |
| toluene | 10.722 |
| ethylbenzene | 0.525 |
| m-xylene | 0.375 |
| p-xylene | 0.183 |
| cumene | 0.031 |
| o-xylene | 0.290 |
| n-propylbenzene | 0.239 |
| 1,3,5-trimethylbenzene | 0.215 |
| sec-butylbenzene | 0.066 |
| o-ethyltoluene | 0.471 |
| 1,2,4-trimethylbenzene | 0.869 |
| o-cymene | 0.040 |
| indane | 1.843 |
| Total aromatics | 64.009 |
| unknown non-olefinic | 0.114 |
| Grand Total | 100.00 |

TABLE II

| Component | Amount, Wt. % |
|---|---|
| Aromatics | |
| benzene | 38–58 |
| toluene | 9–13 |
| ethylbenzene | 0.25–0.75 |
| m-xylene | 0.3–0.5 |
| p-xylene | 0.3–0.5 |
| cumene | 0.01–0.05 |
| o-xylene | 0.1–0.5 |
| n-propylbenzene | 0.05–0.5 |
| 1,3,5-trimethylbenzene | 0.1–0.5 |
| sec-butylbenzene | 0.01–0.1 |
| o-ethyltoluene | 0.1–0.7 |
| 1,2,4-trimethylbenzene | 0.5–1.0 |
| o-cymene | 0.01–0.1 |
| indane | 0.5–2.5 |
| Paraffins | 0.0–10.0 |
| Monoolefins | |
| propene | 0.05–0.15 |
| butene | 0.5–1.5 |
| pentene | 0.0–0.5 |
| Dienes & Pseudodienes | |
| butadienes | 1–5 |
| pentadienes | 3–9 |
| hexadienes | 0.5–1.5 |
| pentatrienes | 0.01–0.05 |
| methylpentadienes | 0.05–0.20 |
| styrene | 1.5–3.5 |
| α-methylstyrene | 0.75–2.0 |
| dicyclopentadiene | 10–20 |
| vinyltoluene | 0.02–0.08 |
| indene | 0.1–0.3 |
| $C_8$ olefinic substituted aromatic | 0.02–0.05 |
| $C_9$ olefinic substituted aromatic | 0.03–0.06 |
| $C_{10}$ olefinic substituted aromatic | 0.05–0.15 |
| $C_9$ alkenylbenzene | 0.03–0.09 |
| cis-propenylbenzene | 0.01–0.04 |
| Alkynes | 0.5–2.0 |
| Cyclic Aliphatic | |
| methylenecyclopentane | 0.02–0.06 |
| methylcyclopentene | 0.05–0.15 |
| cyclohexadiene | 0.25–1.0 |
| $C_7$ olefinic substituted naphthenes | 0.2–0.8 |
| Unknown olefinic | 0–2.0 |
| Unknown non-olefinic | 0.04–0.20 |

As will be appreciated this starting hydrocarbon mixture contains a wide variety of diene and pseudodiene compounds and other materials, a large portion of which is not easily identifiable by standard analytic methods. It is surprising that a crude mixture of this diversity would enter into a reaction with sulfur to provide a useful composition as described herein.

The adduct is formed by reacting about 5–95 wt.% of sulfur with about 95–5 wt.% of the hydrocarbon mixture, with the reaction of about 40–95 wt.% of sulfur and about 5–60 wt.% of the hydrocarbon mixture being preferred. Selection of the relative proportions of sulfur and hydrocarbon mixture is governed by the engineering properties desired for the adduct, with a higher proportion of sulfur producing a more rigid adduct and a higher proportion of the hydrocarbon mixture producing a more pliable and plastic adduct.

The sulfur and the hydrocarbon mixture are reacted at a temperature of about 100°–500° C., with a reaction temperature of about 115°–135° C. being particularly suitable. As shown by the Examples, a temperature of from about 125°–130° C. produces a very high removal efficiency of dienes from the feed and is therefore preferred. The lower portion of this range, that is, a temperature of about 125° C., is energy efficient when compared to the higher end of this range, and therefore is particularly preferred.

The sulfur is melted using an external heat source prior to adding the hydrocarbon mixture. An advantageous manner of combining the starting materials is to pump the hydrocarbon mixture subsurface into the molten surface. The molten sulfur is stirred to insure good mixing when combined with the hydrocarbon mixture, and vigorous mixing is especially advantageous since it results in a relatively higher percentage of the dienes being removed from the feed during the reaction. Vigorous mixing is used with good advantage for the entire time of the reaction. In the reaction, the temperature is monitored and controlled by the use of thermocouples and an external heat source. Particularly suitable locations for the thermocouples are at the bottom of the reactor, at the liqud/gas interface and in the gaseous phase.

The hydrocarbon mixture and sulfur may be reacted all at once, or a portion of the sulfur may be reacted with the hydrocarbon mixture in an initial step in which case the initial reaction product may be shipped to another location for reaction with the remainder of the sulfur.

The sulfur-hydrocarbon mixture reaction may be either at atmospheric pressure or at superatmospheric pressure ranging up to about 1000 p.s.i.g. When atmospheric pressure is used, the reaction takes about 18 hours at a temperature of about 115° C. Since superatmospheric pressure substantially reduces the reaction time, it is preferred for economic reasons. In using superatmospheric pressure, the reactor is sealed to the atmosphere and the reaction is performed in a closed system. A pressure ranging from about 15-100 p.s.i.g. is particularly preferred and a pressure of about 35-80 p.s.i.g. is most preferable.

The reaction time depends upon various factors such as temperature, rate of agitation, catalyst and composition of starting materials. The addition of a small amount of adduct from a previous reaction has a catalytic effect on the reaction mixture, thus reducing the time needed for the reaction to be completed. If a temperature in the range of about 115°-135° C. and a pressure in the range of about 15-100 p.s.i.g. is selected, then a reaction time of about two to six hours is sufficient.

It is within the scope of the present invention to form the adduct in the presence of viscosity stabilizers and antioxidants, or to introduce such additives after the reaction has been completed, and to add any filler to the formed adduct prior to or after removal of the adduct from the reactor.

Any tendency of the DAC/sulfur adduct to become rubbery on heating can be controlled by such methods as addition of conventional chain terminators or chain regulators. Examples of such terminators and regulators are alkyl mercaptans, p-phenylenediamines, sodium salt of dialkyldithiocarbamic acid, hindered phenols, and the like.

The adduct of the present invention is preferably formed using a reaction vessel capable of being pressurized to which there is attached a magnetic stirrer. A magnetic coupled drive system, rather than a solid drive shaft arrangement, is used on the stirrer to enable the reactor to be sealed under both pressure and vacuum conditions. A model 1.5-1.0 MagneDrive II stirrer, manufactured by Autoclave Engineers of Erie, Pa., is illustrative of a magnetic stirrer that may be used to advantage. A stirrer of this type produces effective intermixing of the reactants, whereas a low torque stirrer results in only partial consumption of the dienes.

When the reaction is complete, the sulfur-based adduct is suitably recovered by the following procedure. Unreacted overhead is removed from the reactor by venting the vapors into a condenser/receiver system and allowing the reaction mixture to return to ambient pressure. Additional unreacted material is removed from the reaction mixture by vacuum distillation. During vacuum distillation, the stirring speed is maintained at 1500 r.p.m. until the distillation pressure reaches 500 mm Hg. At this point the stirring speed is reduced to 500 r.p.m. Vacuum distillation is continued to a final pressure of about 50 mm Hg. Use of a nitrogen purge of the reaction product further reduces the unreacted material present in the adduct.

The unreacted organic material, after being flashed off the reaction mixture, is suitable for use in a gasoline pool with little or no hydrogenation and with prior desulfurization if necessary, or may be charged to an aromatic extraction unit for benzene recovery and the like. In forming the adduct of the present invention, several processing advantages are enjoyed which include: (1) eliminating, or at least minimizing, the hydrogen required to convert the DAC or HAC type materials for use in fuel processing; (2) eliminating, or at least minimizing, gum formation in preheaters and in catalyst beds which occurs when heating DAC or HAC type materials due to the presence of dienes; and (3) feeding the unreacted material flashed off the reaction mixture to either a fuel pool after desulfurization, or to a unit designed for recovery of valuable aromatics such as benzene and toluene.

The sulfur-based adduct of the present invention has many uses such as in road surface compositions, sulfur cements, sulfur concretes, coatings, foams and structural materials. Thus, at the conclusion of the reaction, the adduct is mixed with filler, combined with an aggregate, foamed with a blowing agent, mixed with asphalt or some other extender, depending upon the use, or is cooled and then stored in solid form for future remelting and use.

The adduct can be formulated into road surface compositions by mixing it with asphalt in varying proportions and then mixing the resulting mixture with an aggregate suitable for use in highway construction. These compositions are made according to prior art procedures. The disclosure of U.S Pat. No. 3,997,355 to Santucci et al. is hereby incorporated by reference into this application as exemplifying these procedures. Illustratively, about 40 wt.% of adduct is mixed with about 60 wt.% of asphalt, and this combined material is used as a binder for the aggregate in a ratio of about 6-8 wt.% binder to about 92-94 wt.% aggregate. A commonly used aggregate is limestone. Similarly, the adduct is useful as a replacement for asphalt binder for the aggregate.

Sulfur cements or concretes containing this adduct are formulated in the manner of the prior art as illustrated by U.S. Pat. No. 4,058,500 to Vroom, the disclosure of which is hereby incorporated by reference into this application. Structural material which may be in any conventional form such as flat plates or tiles, bricks or pipe sections, containing the adduct of the present invention are prepared according to the prior art as exemplified by U.S. Pat. No. 4,022,626 to McBee et al., the disclosure of which is hereby incorporated by reference into this application. This adduct is also useful in coating compositions, and in this regard there is hereby incorporated by reference into this application the disclosures of U.S. Pat. Nos. 3,459,717 to Signouret and 4,164,428 to Simic, which generally illustrate formulating a coating composition containing this type of adduct. Fillers such as mica, muscovite, glass fiber and talc are particularly useful in structural materials, coatings, as well as in foams.

For coating walls, drainage canals, earthen dams or tanks, settling tanks, tailings ponds, product storage piles, etc., a layer of a thickness of at least about ⅛" of the coating composition is generally preferred. This is usually most conveniently accomplished by means of spray coating, using any apparatus capable of providing a relatively uniform coating of the molten composition in the desired thickness. An air or airless spraying system can be used. In addition, the use of spray nozzles that create a spray pattern, but do not overly atomize the coating composition, is preferred.

The adduct of this invention is useful in insulators. These sulfur-based insulators are formulated in the manner of the prior art.

The sulfur-based adduct of the present invention is also useful in foams. These sulfur-based foams are prepared according to prior art methods such as exemplified by U.S. Pat. No. 3,823,019 to Dale et al., U.S. Pat. No. 3,887,504 to Woo and U.S. Pat. No. 4,011,719 to Woo. The disclosures of these three patents are hereby incorporated by reference into this application.

In the following examples, DAC feedstocks obtained from B. F. Goodrich were subjected to reaction with sulfur. Table III shows the analysis of the feedstocks used in these examples.

TABLE III

| Component | Feed amount wt. % | Unreacted amount recovered wt. % |
|---|---|---|
| Olefins | | |
| propene | 0.083 | 0.022 |
| butene | 0.727 | 0.107 |
| butadienes | 3.529 | 0.213 |
| pentadienes | 6.069 | 0.143 |
| pentene | 0.189 | 0.099 |
| hexadienes | 1.296 | 0.940 |
| pentatrienes | 0.032 | 0.074 |
| methylenecyclopentane | 0.039 | 0 |
| methylpentadienes | 0.117 | 0.037 |
| methylcyclopentene | 0.084 | 0 |
| cyclohexadiene | 0.592 | 0 |
| styrene | 2.670 | 0.020 |
| α-methylstyrene | 1.635 | 0 |
| dicyclopentadiene | 14.910 | 0 |
| vinyltoluene | 0.051 | 0 |
| indene | 0.228 | 0 |
| $C_7$ olefinic substituted naphthenes | 0.411 | 0.044 |
| $C_8$ olefinic substituted aromatic | 0.034 | 0 |
| $C_9$ olefinic substituted aromatic | 0.042 | 0.119 |
| $C_{10}$ olefinic substituted aromatic | 0.093 | 0.021 |
| $C_9$ alkenylbenzene | 0.059 | 0 |
| cis-propenylbenzene | 0.030 | 0 |
| unknown olefinic | 1.781 | 0.315 |
| Total olefinic | 34.701 | 3.049 |
| Alkynes | | |
| butyne | 1.090 | 0.016 |
| Paraffins | | |
| $C_5$ | 0.133 | 0.797 |
| Aromatics | | |
| benzene | 48.093 | 79.381 |
| toluene | 10.722 | 15.283 |
| ethylbenzene | 0.525 | 0.586 |
| m-xylene | 0.375 | 0.397 |
| p-xylene | 0.183 | 0.212 |
| cumene | 0.031 | 0 |
| o-xylene | 0.290 | 0.203 |
| n-propylbenzene | 0.239 | 0 |
| m-ethyltoluene | 0 | 0.015 |
| 1,3,5-trimethylbenzene | 0.215 | 0 |
| sec-butylbenzene | 0.066 | 0 |
| o-ethyltoluene | 0.471 | 0 |
| t-butylbenzene | 0 | 0.061 |
| 1,2,4-trimethylbenzene | 0.869 | 0 |
| o-cymene | 0.040 | 0 |
| indane | 1.843 | 0 |
| Total Aromatics | 64.009 | 96.138 |
| unknown non-olefinic* | 0.114 | 0 |
| Grand Total | 100.0 | 100.0 |

*Identified as olefinic or non-olefinic by treating Goodrich DAC with Burrell "Sorbent A" (mercury complex with a strong affinity for olefins).

The following Examples are presented to illustrate the invention, but it is not to be considered limited thereto. In these Examples, and throughout the specification, parts are by weight, unless otherwise indicated.

EXAMPLE 1

Into a sealed reactor to which there is attached a magnetic stirrer of the type discussed above, adapted with an air motor drive, 843 g (21 wt.%) of DAC having the diene analysis shown in Table II is pumped subsurface at an initial rate of 33 g/min. into 3165 g (79 wt.%) of stirred molten surface (precipitated, U.S.P.) at 130° C. and at ambient pressure. The stirring speed is 1500 r.p.m. The pressure in the reactor, which is in a closed system, increases to a maximum of 48 p.s.i.g., then decreases as the reaction proceeds, with the average pressure being 41 p.s.i.g. for the duration of the reaction. Under a constant stirring speed of 1500 r.p.m., the reaction is continued for two hours at or near 130° C. using an external heat source and monitoring the reaction temperature by means of thermocouples located at the bottom of the reaction mixture, at the liqud/gas interface and in the gaseous phase. Two hours later, unreacted overhead is removed from the reactor by venting the vapors into a condenser/receiver system, and the reaction mixture is allowed to return to ambient pressure. Additional unreacted material is removed by vacuum distillation. During the distillation, the stirring speed is maintained at 1500 r.p.m. until the pressure reaches 500 mm Hg, at which point it is reduced to 500 r.p.m. to prevent foamed reaction mixture from entering the delivery tube leading to the condenser. The distillation is continued to a final pressure of 50 mm Hg. 3509 g (88 wt.%) of sulfur-based adduct having a sulfur content of 89 wt. % is then removed from the reactor. After cooling for approximately twenty-four hours, the black adduct is solid and rigid. Analysis of the unreacted material by gas chromatography shows a 99% removal efficiency of diene and pseudodiene compounds from the DAC feed.

EXAMPLE 2

Following the procedure of Example 1, 843 g (21 wt.%) of the DAC is pumped at an initial rate of 32 g/min. into 3166 g (79 wt.%) of the sulfur. The reaction temperature averages 130° C. for the 120-minute reaction time. The average pressure during the reaction is 42 p.s.i.g. After removal of the unreacted material, there is recovered 3490 g (88 wt.%) of the adduct. Analysis of the unreacted material reveals a 99% efficiency of diene and pseudodiene removal from the DAC feed.

EXAMPLE 3

Following the procedure of Example 1, 1198 g (35 wt.%) of DAC having the diene analysis shown in Table 2 is pumped at an initial rate of 34 g/min. into 2250 g (65 wt.%) of the sulfur. The average reaction temperature is 129° C. and the reaction time is 120 minutes. A maximum pressure of 46 p.s.i.g. is obtained during the reaction, with the average pressure being 43 p.s.i.g. Unreacted material is removed from the reaction product to yield 2692 g (79 wt.%) of a black adduct containing 83 wt. % sulfur. This adduct, upon cooling, becomes solid and rigid. Analysis of the unreacted material shows 99% removal efficiency of diene and pseudodiene compounds from the feed.

EXAMPLE 4

Following the procedure of Example 1, 1398 g (44 wt.%) of DAC having the diene analysis shown in Table 2 is pumped at an initial rate of 35 g/min. into 1749 g (56 wt.%) of the sulfur. The reaction temperature averages 130° C. for the 120-minute reaction time. During the reaction, the pressure increases to a maximum of 48 p.s.i.g. with the average pressure being 44 p.s.i.g. After removing the unreacted material, there is recovered 2261 g (73 wt.%) of black adduct containing 75 wt. % sulfur. Upon cooling, this adduct increases in solid character but retains resiliency. Analysis of the unreacted material shows 97% efficiency of diene and pseudodiene removal from the feed.

EXAMPLE 5

Following the procedure of Example 1, 844 g (21 wt.%) of DAC having the diene analysis shown in Table 2 is pumped at an initial rate of 35 g/min. into 3168 g (79 wt.%) of the sulfur. The reaction temperature averages 125° C. for the 120-minute reaction time, with the average pressure during the reaction being 40 p.s.i.g. Upon removal of the unreacted material, there is obtained 3465 g (87 wt.%) of the adduct. Analysis of the unreacted material shows a 99% efficiency of diene and pseudodiene removal from the DAC feed.

EXAMPLE 6

Following the procedure of Example 1 except that a nitrogen purge and a lower final pressure of 5 mm Hg is used to remove even more unreacted material from the adduct, 844 g (21 wt.%) of DAC having the diene analysis shown in Table II is pumped at an initial rate of 33 g/min. into 3164 g (79 wt.%) of the sulfur. The reaction temperature averages 125° C. for the 120-minute reaction time, with the average pressure during the reaction being 37 p.s.i.g. After removal of the unreacted material, there is recovered 3473 g (87 wt.%) of the adduct containing 91 wt. % of sulfur. Analysis of the unreacted material shows a 99% efficiency of diene and pseudodiene removal from the DAC feed.

EXAMPLE 7

Following the procedure of Example 1, 2351 g (53 wt.%) of DAC having the diene analysis shown in Table 2 is pumped at an initial rate of 30 g/min. into 2103 g (47 wt.%) of the sulfur. The reaction temperature averages 125° C. for the 125-minute reaction time. During the reaction, the pressure increases to a maximum of 62 p.s.i.g., with the average pressure being 51 p.s.i.g. After removing the unreacted material, there is recovered 2866 g (65 wt.%) of black adduct containing 73 wt. % sulfur. Upon cooling, this adduct retains its plastic character as demonstrated by its ability to flow at ambient temperatures. Analysis of the unreacted material shows 96% efficiency of diene and pseudodiene removal from the feed.

EXAMPLE 8

Following the procedure of Example 1, 3113 g (58 wt.%) of DAC having the diene analysis shown in Table 2 is pumped at an initial rate of 31 g/min. into 2228 g (42 wt.%) of the sulfur. The reaction temperature averages 124° C. for the 155-minute reaction time. During the reaction, the pressure increases to a maximum of 58 p.s.i.g. with the average pressure being 47 p.s.i.g. After removing the unreacted material, there is recovered 3185 g (61 wt.%) of black adduct containing 69 wt. % sulfur. Upon cooling, this adduct retains its plastic character as in Example 7. Analysis of the unreacted material shows 95% efficiency of diene and pseudodiene removal from the feed.

EXAMPLE 9

Following the procedure of Example 1, 2386 g (53 wt.%) of DAC having the diene analysis shown in Table 2 is pumped at an initial rate of 31 g/min. into 2132 g (47 wt.%) of the sulfur. The reaction temperature averages 129° C. for the 120-minute reaction time. During the reaction, the pressure increases to a maximum of 67 p.s.i.g., with the average pressure being 57 p.s.i.g. After removing the unreacted material, there is recovered 2901 g (66 wt.%) of black adduct containing 73 wt. % sulfur. Upon cooling this adduct retains its plastic character as in Examples 7 and 8. Antioxidants were added to samples of this adduct. Analysis of the unreacted material shows 95% efficiency of diene and pseudodiene removal from the feed.

EXAMPLE 10

Following the procedure of Example 1 except that a low torque stirrer is used instead of the magnetic stirrer, 1261 g (21 wt.%) of DAC having the diene analysis shown in Table II is pumped at an initial rate of 30 g/min. into 4692 g (79 wt.%) of the sulfur. The reaction temperature averages 135° C. for the sixty-minute reaction time. The average reaction pressure is 60 p.s.i.g. After the unreacted material is removed, there is recovered 4973 g (83 wt.%) of adduct. The unreacted material shows a 54% efficiency of diene and pseudodiene removal from the DAC feed.

EXAMPLE 11

Following the procedure of Example 10, 1256 g (21 wt.%) of DAC having the diene analysis shown in Table 2 is pumped at an initial rate of 31 g/min. into 4749 g (79 wt.%) of the sulfur. The reaction temperature averages 116° C. for the 120-minute reaction time. The average pressure during the reaction is 50 p.s.i.g. After removal of the unreacted material 5050 g (85 wt.%) of adduct is recovered. Analysis of the unreacted materials shows an 82% efficiency of diene and pseudodiene removal from the DAC feed.

EXAMPLE 12

Following the procedure of Example 10, 1268 g (21 wt.%) of DAC having the diene analysis shown in Table 2 is pumped at an initial rate of 32 g/min. into 4752 g (79 wt.%) of the sulfur. The reaction temperature averages 116° C. for the 120-minute reaction time. The average pressure is 50 p.s.i.g. Upon removal of the unreacted material, there is obtained 5104 g of adduct. Analysis of the unreacted material shows an 81% removal efficiency of diene and pseudodiene compounds from the feed.

EXAMPLE 13

An aggregate-asphalt composition containing the adduct of the present invention is prepared by combining the adducts of Examples 1 and 2, and then mixing the combined material with asphalt in a ratio of 40% adduct to 60% asphalt. The resulting mixture is blended for thirty minutes at 130° C. at 1500 r.p.m., and then combined with limestone aggregate at a temperature of 130° C. using a heavy-duty commercial rotary mixer for 9 to 10 minutes.

This composition is tested for Hveem stability, tensile strength and for repeated-load tensile strength as follows. The aggregate-asphalt-adduct mixture is placed into an oven at 121° C. to insure constant molding temperature prior to forming molded samples. The hot mixture is then placed into the mold of a gyratory shear compactor, the mold of which is maintained at a temperature of 121° C. A specimen is then formed by compacting the sample initially at a pressure of 50 p.s.i.g., then increasing the pressure to 150 p.s.i.g., and finally applying a pressure of 2500 p.s.i.g. After removal from the mold, each specimen is aged for 48 hours, then weighed, measured and brought to a temperature of 60° C. After 3.5 hours at 60° C. each specimen is tested for Hveem stability in accordance with the method accepted by the Texas Highway Department (Tex-208-F), which is a modification of ASTM D 1560. At this temperature, an average Hveem stability of 70.8 is obtained for three samples.

At 41° F., there is found to be an average tensile strength of 203 p.s.i. and an average static modulus of elasticity of 198,608 p.s.i. for three samples. At 77° F., there is found to be an average tensile strength of 70 p.s.i. and an average static modulus of elasticity of 116,091 p.s.i. for three samples. At 104° F., there is found to be an average tensile strength of 53 p.s.i. and an average static modulus of elasticity of 106,887 p.s.i. for three samples.

Using three more groups of three samples, there is found to be an average resilient modulus of elasticity of 862,823 p.s.i. at 41° F. for one group of three samples. For another group of three samples, there is found to be an average resilient modulus of elasticity of 478,971 p.s.i. at 77° F. Using a third group of three samples, there is found to be an average resilient modulus of elasticity of 369,487 p.s.i. at 104° F.

INDUSTRIAL APPLICABILITY

The adduct of the present invention is useful in road surface compositions, in sulfur cements, in sulfur concretes, in sulfur-based foams and in sulfur-based structural members such as flat plates or tiles, bricks or pipe sections, and in sulfur-based insulators. In a road surface composition, the adduct is useful either as an asphalt extender or as a replacement for asphalt.

What is claimed is:

1. A sulfur-based adduct produced by (a) reacting at a temperature of about 100°-150° C., a composition comprising (1) about 5-95 wt.% of sulfur and (2) about 95-5 wt.% of a by-product hydrocarbon mixture comprising about 45-98 wt.% of aromatic, non-pseudodiene compounds, about 1-40 wt.% of diene and pseudodiene compounds, about 0-15 wt.% of other organic compounds that are substantially unreactive with sulfur and up to about 54 wt.% of unidentified compounds; whereby the sulfur reacts with each of the diene and pseudodiene compounds in said mixture; and (b) removing unreacted material from the reaction product.

2. The adduct of claim 1 wherein the by-product mixture is selected from the group consisting of depentanized aromatic concentrate, heavy aromatic concentrate, dripolene and light oil from coal processing.

3. The adduct of claim 2 wherein the hydrocarbon mixture is depentanized aromatic concentrate.

4. The adduct of claim 3 wherein the depentanized aromatic concentrate comprises about 50-70 wt.% of the aromatic, non-pseudodiene compounds, about 15-40 wt.% of the diene and pseudodiene compounds, and about 0.5-2.0 wt.% of paraffins, with the remaining up to about 35 wt.% being unidentified compounds.

5. The adduct of claim 1 wherein the composition comprises about 40-80 wt.% of sulfur and about 20-60 wt.% of the hydrocarbon mixture.

6. The adduct of claim 1 wherein the reaction temperature is about 115°-135° C.

7. The adduct of claim 1 wherein the reaction is carried out at superatmospheric pressure ranging up to about 1000 p.s.i.g.

8. The adduct of claim 7 wherein the pressure ranges from about 15-100 p.s.i.g.

9. The adduct of claim 8 wherein the pressure is about 35-80 p.s.i.g.

10. The adduct of claim 1 wherein the reaction time is about six hours.

11. A road surface composition comprising an aggregate suitable for use in highway construction and the adduct of claim 1 as a binder for the aggregate.

12. The road surface composition of claim 11 wherein the binder further comprises asphalt.

13. A sulfur cement comprising the adduct of claim 1.

14. A sulfur concrete comprising the adduct of claim 1.

15. A sulfur-based coating composition comprising the adduct of claim 1.

16. The coating composition of claim 15 further comprising a filler selected from the group consisting of mica, muscovite, glass fibers, talc and mixtures thereof.

17. A sulfur-based foam comprising the adduct of claim 1.

18. A sulfur-based structural material comprising the adduct of claim 1.

19. The structural material of claim 18 further comprising a filler selected from the group consisting of mica, muscovite, glass fibers, talc and mixtures thereof.

20. A sulfur-based insulator comprising the adduct of claim 1.

21. A process for producing a sulfur-based adduct, said process comprising the steps of
(a) reacting at a temperature of about 100°-150° C., a composition comprising (1) about 5-95 wt.% of sulfur and (2) about 95-5 wt.% of a by-product hydrocarbon mixture comprising about 45-98 wt.% of aromatic, non-pseudodiene compounds, about 40 wt.% of diene and pseudodiene compounds, about 0-15 wt.% of other organic compounds that are substantially unreactive with sulfur and up to about 54 wt.% of unidentified compounds; whereby the sulfur reacts with each of the diene and pseudodiene compounds in said mixture; and
(b) removing unreacted material from the reaction product.

22. The process of claim 21 wherein the hydrocarbon mixture is depentanized aromatic concentrate.

23. The process of claim 21 wherein said composition comprises about 40-95 wt.% of sulfur and about 5-60 wt.% of the hydrocarbon mixture.

24. The process of claim 23 wherein the by-product hydrocarbon mixture is selected from the group consisting of depentanized aromatic concentrate, heavy aromatic concentrate, dripolene and light oil from coal processing.

25. The process of claim 22 wherein the depentanized aromatic concentrate comprises about 50-80 wt.% of the aromatic, non-pseudodiene compounds, about 15-40 wt.% of the diene, pseudodiene and monoolefin compounds, and about 0.5-2.0 wt.% of paraffins, with the remaining up to about 35 wt.% being unidentified compounds.

26. The process of claim 21 wherein the reaction temperature is about 115°-135° C.

27. The process of claim 21 wherein the reaction is carried out superatmospheric pressure ranging up to about 1,000 p.s.i.g.

28. The process of claim 27 wherein the pressure ranges from about 15-100 p.s.i.g.

29. The process of claim 22 wherein the reaction time is about six hours.

* * * * *